Aug. 23, 1938.   J. H. HUNT   2,127,600
VEHICLE WHEEL
Original Filed July 27, 1933
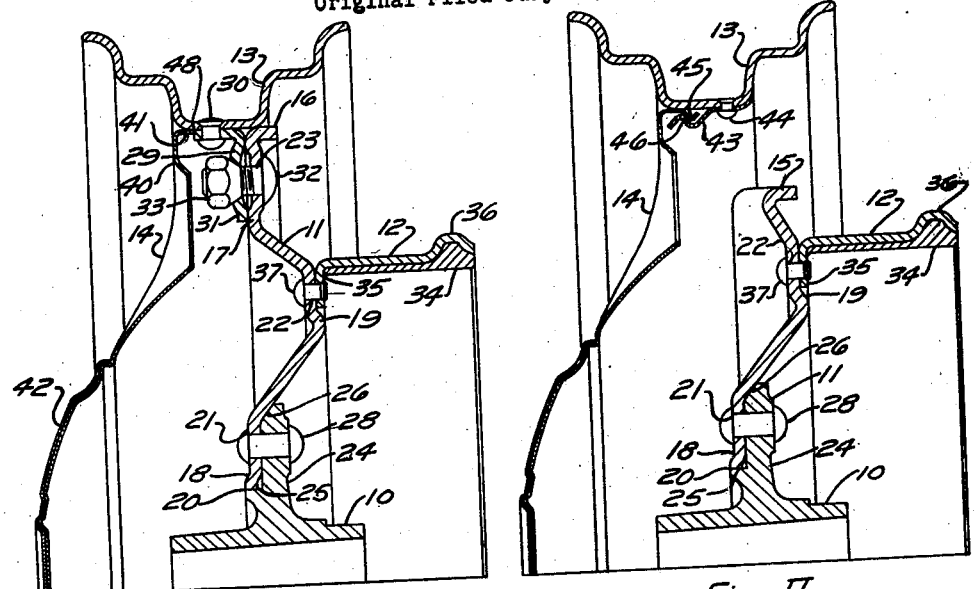
Fig. I
Fig. II
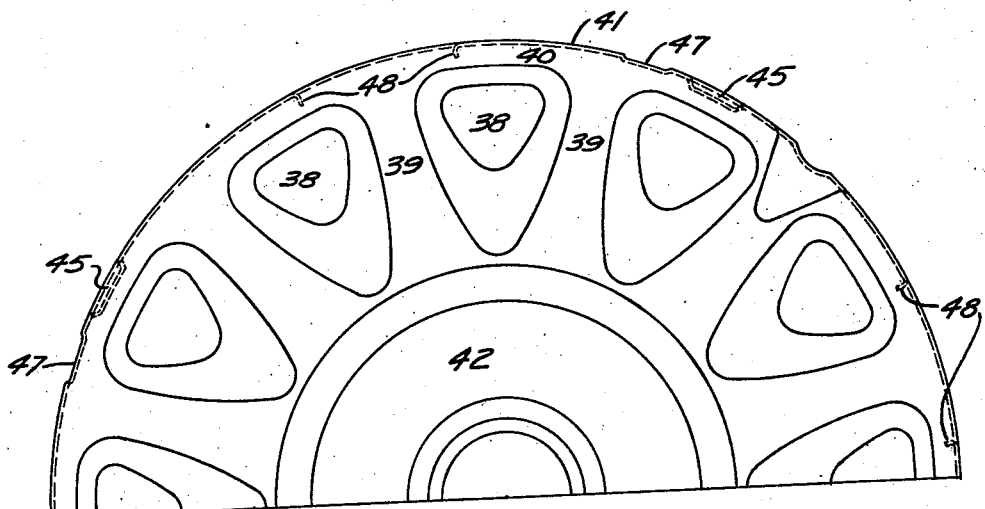
Fig. III
INVENTOR.
J HAROLD HUNT
BY
Carroll R. Taber
ATTORNEY.

Patented Aug. 23, 1938

2,127,600

UNITED STATES PATENT OFFICE

2,127,600

VEHICLE WHEEL

J Harold Hunt, Lansing, Mich., assignor to Motor Wheel Corporation, Lansing, Mich., a corporation of Michigan Original application July 27, 1933, Serial No. 682,373. Divided and this application August 5, 1936, Serial No. 94,409

2 Claims. (Cl. 301—37)

This invention relates to vehicle wheels and more particularly to the combination with a wheel body having a rim detachably connected thereto of an ornamental cover detachably secured to the rim and arranged to conceal the means for detachably connecting the rim to the wheel body.

This application is a division of my co-pending application Serial No. 682,373, filed July 27, 1933.

A preferred embodiment of the invention is illustrated in the accompanying drawing, wherein—

Figure I is a partial cross-sectional view of a vehicle wheel;

Figure II is a partial cross-sectional view through another portion of the same wheel; and Figure III is a partial front view in elevation of the cover shown in Figures I and II.

The wheel illustrated in Figures I and II comprises a hub 10, a wheel body 11, a brake drum 12, a rim 13, and a cover 14.

The wheel body 11 consists of a square blank preferably formed of sheet metal. The extreme corner portions of the blank are cut away and a laterally extending flange 15 is formed about the perimeter of the blank. The flange 15 thus provides a rim centering seat 16 at each corner of the blank in the form of a segment of a cylinder.

The wheel body is deeply dished in its intermediate portion to provide an outer rim attaching zone represented by flat radial extending portions 17 at each corner, an inner hub attaching zone comprising a radially extending annular portion 18 and an intermediate brake drum attaching zone comprising a radially extending annular portion 19. As best shown in Figure I, the rim and hub attaching zones lie in substantially the same radial plane while the brake drum attaching zone lies in a radial plane spaced axially inward from the said other zones.

A circular opening 20 is provided in the center of the wheel body. Suitable openings 21 for the reception of attaching means are formed in the hub attaching zone 18. Similar openings 22 for the reception of attaching means are formed in the brake drum attaching zone 19. A single opening 23 for the reception of a stud is formed in the rim attaching zone 17 adjacent each corner of the wheel body.

The hub 10 has the usual radially extending flange 24 provided with a shoulder 25 adjacent its inner extremity and an inclined annular contacting surface 26 adjacent its outer extremity. The wheel body 11 is mounted upon the hub with its inner edge defining the central opening 20, seated upon the shoulder 25 with its annular hub attaching zone 18 contacting the face of the hub flange 24 and with its dished annular portion immediately adjacent the hub attaching zone 18 contacting the inclined annular surface 26. The hub flange 24 is provided with openings registering with the openings 21 in the wheel body. Rivets 28 extending through these registering openings permanently attach the wheel body to the hub flange.

Four circumferentially spaced apart rim attaching lugs 29 are permanently secured to the inner surface of the base of the rim 13 by rivets 30. The rim attaching lugs 29 include a radially extending portion 31 provided with an opening adapted to register with the openings 23 in the rim attaching zone 17 of the wheel body. A securing bolt 32 projecting through each of the openings 23 and which is preferably permanently attached to the wheel body extends through the opening in the radial portion 31 of each of the lugs 29 when the rim is mounted upon the circumferentially spaced apart rim seats 16. The rim is held in position upon the wheel body by means of nuts 33 threaded on to the outer extremity of the bolts 32 whereby the radially extending portion 31 of the lug is locked against the radially extending portions 17 of the wheel body.

When the rim is thus secured in position it may contact the rim seats 16 or may be spaced slightly therefrom but is spaced radially from the portions of the perimeter of the wheel body 11 intermediate the corners thereof, as clearly shown in Figure II.

The brake drum 12, which may be of any conventional form and which is here shown as of the type which has a cast wear-resisting inner liner 34, is provided with a radially extending attaching flange 35 at one edge thereof and a stiffening rib 36 adjacent the other edge. The radially extending attaching flange 35 is provided with circumferentially spaced apart openings adapted to register with the openings 22 in the brake drum attaching zone 19 of the wheel body. The brake drum is permanently attached to the wheel body by means of rivets 37 projecting through these registering openings.

The cover 14, which is here shown as being of generally frusto-conical formation, has a plurality of circumferentially spaced apart openings 38 formed therein adjacent the periphery thereof which provide intermediate spoke portions 39. The periphery of the cover is formed with a radially extending annular portion 40 constituting a continuation of the spokes 39 and an annular integral axially extending flange 41. The central portion of the cover is preferably imperforate but designed to receive a removable disk 42 simulating the appearance of a conventional hub cap. This disk member 42 may be dispensed with entirely or may be permanently attached to the cover 14, if desired.

The cover 14 is removably attached to the inner surface of the base of the rim 13 by means of resilient retention members 43 permanently secured to the inner surface of the rim 13 by means of rivets 44. The resilient retention devices 43 are secured to the rim at circumferentially spaced apart points intermediate the rim attaching lugs 29.

The peripheral flange 41 of the cover 14 is provided at circumferentially spaced apart intervals with depressed portions 45 which are engaged by the bead 46 formed adjacent the outer extremity of the retention devices 43. Suitable grooves or slots 47 are formed in the flange 41 adjacent the depressions 45 for the reception of a tool which may be utilized for removing the cover.

When the cover is installed the peripheral flange 41 thereof contacts the inner surface of the base of the rim 13, as shown. In order to provide a snug fit between these parts the flange 41 is cut away at four points, as indicated at 48, to prevent interference with the rim attaching lug 29.

From the foregoing description it will be apparent that this invention provides a novel wheel construction employing an ornamental cover arranged to conceal the wheel body and the rim securing means utilized in detachably connecting the rim to the wheel body. Thus, the wheel body and the rim securing means may be formed primarily for utility and without regard to ornamentation.

While only a preferred embodiment of the invention has been herein shown and described, it should be understood that the invention is not limited to this particular embodiment, but is co-extensive with the scope of the appended claims.

I claim:

1. A wheel including, in combination, a wheel body having a plurality of circumferentially spaced rim seats, a rim mounted upon the seats, securing means for detachably connecting the rim to the wheel body, an ornamental cover arranged to conceal said wheel body and said rim securing means, said cover having an axially extending peripheral flange concentric with and located within said rim, an attaching clip secured to said rim intermediate said rim seats and engaging said flange, said rim securing means including abutments for the axially inner edges of the peripheral flange on said cover.

2. A wheel including, in combination, a wheel body having a plurality of circumferentially spaced rim seats, a rim mounted upon the seats, securing means for detachably connecting the rim to the wheel body, an ornamental cover arranged to conceal said wheel body and said rim securing means, said cover having an axially extending peripheral flange concentric with and located within said rim, and resilient attaching clips secured to said rim intermediate said rim seats for securing said cover to said wheel, said clips holding said cover against axially outward movement of said cover with respect to the wheel, the said rim securing means including abutments for the axially inner edges of the peripheral flange of said cover.

J HAROLD HUNT.